July 2, 1968   W. VAN BEUREN KING ET AL   3,390,695
LIQUID TREATMENT DEVICE
Filed July 19, 1965

INVENTORS
WILLARD VAN BEUREN KING
AND DAVID W. KRATZ.
BY Ralph W. Kalish
ATTORNEY

United States Patent Office 3,390,695
Patented July 2, 1968

3,390,695
LIQUID TREATMENT DEVICE
Willard Van Beuren King and David W. Kratz, St. Louis, Mo., assignors to King-Kratz Corporation, Clayton, Mo., a corporation of Missouri
Filed July 19, 1965, Ser. No. 472,846
6 Claims. (Cl. 137—268)

ABSTRACT OF THE DISCLOSURE

A liquid treatment device containing a supply of solid agent soluble in the liquid to be treated and having a plurality of vertically arranged apertures in its side wall and a discharge opening in its bottom wall for establishing a continuous circulation through the container; and having means for selectively closing said vertically arranged apertures for controlling the amount of agent exposed for dissolution.

---

This invention relates in general to liquid treatment and particularly to a device for dispensing treating agents into a liquid body.

It is an object of the present invention to provide a liquid treatment device for disposition within a liquid body designed to contain a supply of a soluble liquid treating agent, and being adapted for controlling the amount of treating agent dissolved.

It is another object of the present invention to provide a device of the character stated which is adapted to contain a normally dry treating agent for dissolution within liquid from the ambient liquid body and being further adapted to maintain such agent in a dry state until subjected to dissolution.

It is a further object of the present invention to provide a device of the character stated which is uniquely adapted for passage therethrough of liquid from the liquid body for dissolution of the treating agent therein and being further adapted to control the rate of flow of the liquid therethrough.

It is another object of the present invention to provide a liquid treatment device adapted for flow of liquid therethrough and having means for maintaining such liquid at a pre-selected level therein.

It is a still further object of the present invention to provide a liquid treatment device containing a supply of a normally dry treating agent soluble in the liquid to be treated, and being adapted for selectively exposing predetermined portions of its total supply of treating agent to the liquid for control of the amount dissolved for discharge into the body of the liquid.

It is another object of the present invention to provide a liquid treatment device of the character stated which incorporates means for selectively controlling the rate of discharge of the solution dispensed.

It is a further object of the present invention to provide a liquid treatment device which may be most economically manufactured; which does not require the services of a skilled attendant in operation, but is entirely automatic; which is conducive to operation over relatively extensive periods of time without observation; the use of which effects marked savings in the cost of treating agents over currently available systems; and which is durable in usage.

Other objects and details of the invention will be apparent from the following description, when read in connection with the accompanying drawing (one sheet) wherein—

Figure 1:
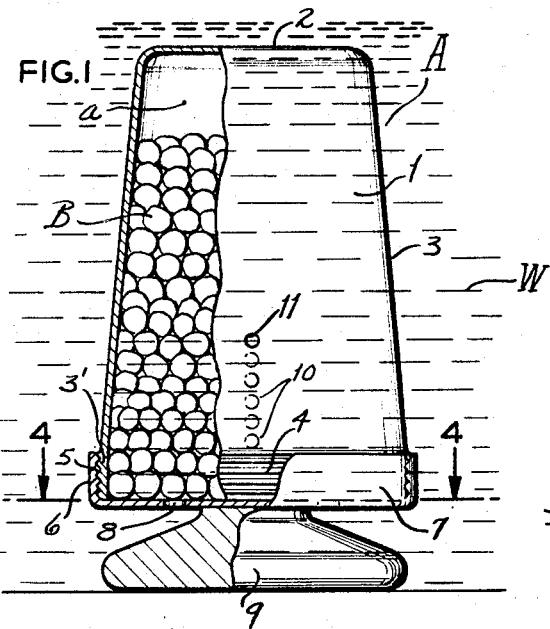
FIGURE 1 is an elevational view in partial section of a liquid treatment device constructed in accordance with and embodying the present invention, illustrating the same within a body of liquid to be treated.

Referring now by reference characters to the drawing which illustrates practical embodiment of the present invention, A designates a liquid treatment device comprising a generally frusto-conical container 1, fabricated of any suitable, durable, non-reactive material which may be preferably transparent, such as Plexiglas;[1] said container 1 being open at its lower end and having a top wall 2 and a side wall 3 which may be polygonal, cylindrical, or tapered as shown; the lower end of said side wall 3 having a substantially vertical marginal portion or skirt 3' which is externally threaded as at 4 for engagement with the internal threads 5 upon the upwardly extending flange 6 of a closure member 7, also preferably formed of like material as container 1, for effecting a liquid proof securement to said container throughout the extent of the joint between said flange 6 and the marginal portion 3' to deny therebetween undesired flow of liquid. Said closure member 7 is provided with a pair of diametrally aligned openings 8. Integrally secured to closure member 7 between openings 8, and depending from the lower central portion thereof is a base member 9 being formed of substantially heavy material so as to provide a ballast or stabilizer for device A. The lower face of base 9 may be planar for disposing said device A upon a support surface such as, for instance, upon the floor of a liquid tank, swimming pool, or other liquid vessel. Base member 9 will urge device A downwardly within the liquid body as designated W, while simultaneously serving to prejudice same into a substantially upright position so that regardless of the buoyancy of device A when in actual usage, the same will be upright for effective operation as discussed hereinbelow. It should be recognized that, if desired, base member 9 may be replaced by extraneous means for supporting container 1 in operative position.

Provided on wall 3 of device A immediately upwardly of marginal portion or skirt 3' is a vertically arranged series of, preferably circular, scored portions 10. It is apparent that there may be any pre-selected number of scored portions 10, but a series of six (6) has proved in actual practice to be highly efficacious. The said scored openings 10 extend but a relatively short distance upwardly of container 1 so that the major portion of the latter is above the uppermost scored opening 10.

In actual usage, closure member 7 is disengaged from container 1 with the latter being inverted and appropriately provided with a supply of a solid soluble liquid treatment material as indicated at B and then closure 7 is returned to container closed condition. A limited air space as indicated at *a* may be provided.

The user will then selectedly remove one of the scored

[1] Trademark of Rohm & Haas Co. for acrylic resin.

portions 10 to create a water inlet orifice 11, and thereupon place device A within the body of liquid to be treated. When in initial condition with a supply of agent B, device A will be of such weight as to slowly sink to the bottom of the liquid vessel remaining upright during descent for reasons above stated, and coming to rest on the vesssel bottom supported by base 9. Liquid entering container 1, as through orifice 11 and openings 8, will flow through or penetrate the quantity of agent B between closure member 7 and the open orifice 11, effecting dissolution of such agent B, and causing discharge of the solution into the ambient liquid W. A continuous flow is developed through the said portion of agent B, so that liquid from the body to be treated is constantly entering device A, dissolving agent B therein, and then is reintroduced into the liquid for treatment purposes.

In view of the disposition of scored portions 10 together with their resultant orifices 11 being located in the lower portion of device A, all of the agent B located above the particular orifice provided will be maintained in a dry state by reason of the entrapment of air, as the same is forced into the upper portion of container 1 by the liquid entering said container 1. Thus, the air so confined will exert a downward pressure on the liquid in container 1, to create a well-defined level of demarcation between the liquid and gas phases. A reservoir of dried agent is, provided, thereby, for constant feeding into the lower, operative portion of device A by reason of descent through gravity as the lowermost portions of the agent are dissolved and carried into the liquid body being treated. The air serves to retain the agent B against premature subjection to dissolution so that no inadvertent slushy mass is developed which might tend to waste agent B as well as bring about a clogging of the orifices and openings. By reason of this novel, constant supply of agent B, device A will be operative in an unattended manner for extensive periods of time. It is apparent that the supply of agent B will depend upon the volume of device A so that the same is rendered capable of automatic and reliable functioning throughout extended periods.

The arrangement of scored portions 10, one above the other, provides a most economic attribute to device A in that the operator, by appropriate selection, may control the amount of dissolution of the agent within the liquid, as well as the concentration of the solution being discharged through the apertures of container 1. It is the volume of liquid within container 1, or, in other terms, the quantity, amount, or number of units, of agent B, such as tablets, exposed to the liquid which is critical for the operation of the present invention. The particular, selected uppermost orifice 11 will be the determinant, as it establishes the heighth dimension for the volume of container 1 to be presented for liquid reception. Device A may be operated by simultaneously having more than one orifice 11 open, but it will be observed that the uppermost of such group will directly affect the quantity of liquid within container 1 for dissolution of agent B. The greater the amount of agent B subjected to the liquid, the greater will be the rate of dissolution of said agent B. Therefore, appropriate selectivity of the location of the uppermost orifice 11 will allow for regulation of the dissolution rate of agent B.

By the indicated opening and closing of orifices 11, the operator may easily control the dissolution rate of agent B, whereby will be achieved a result hitherto unattainable by prior structures. The relatively closely controlled dissolution of agent B will assure of the maintenance of requisite levels of said agent in the liquid body being treated, as well as bring about a marked economy in agent consumption.

Closure of a non-used orifice may be effected in any suitable manner, but upon the condition that such be fluid-proof; one expedient would be the utilization of a compressible closure as indicated at 12 as in the nature of a stopper or cork. However, as stated, the particular type of closure does not form a part of the present invention.

Figure 5:
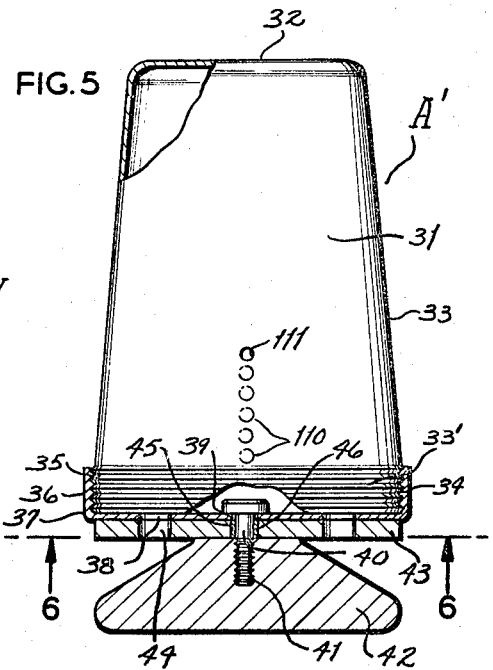
FIGURE 5 is an elevational view in partial section of another form of liquid treatment device constructed in accordance with and embodying the present invention, which form incorporates a rotatable flow control plate.
Figure 2:
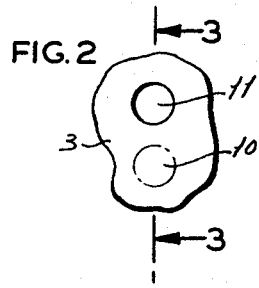
FIGURE 2 is a fragmentary, enlarged front view of a portion of the wall of the device shown in FIGURE 1, illustrating adjacent liquid inlets.
Figure 3:
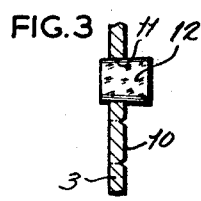
FIGURE 3 is a vertical transverse section taken substantially on the line 3—3 of FIGURE 2, but showing a closure member received within the upper opening.
Figure 6:
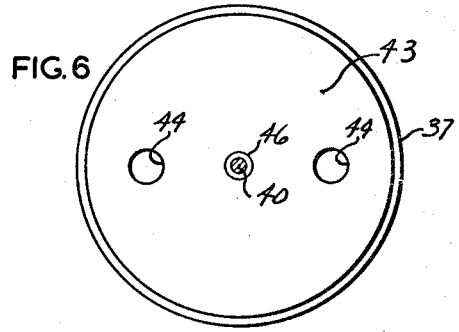
FIGURE 6 is a horizontal transverse sectional view taken on the line 6—6 of FIGURE 5.
Figure 4:
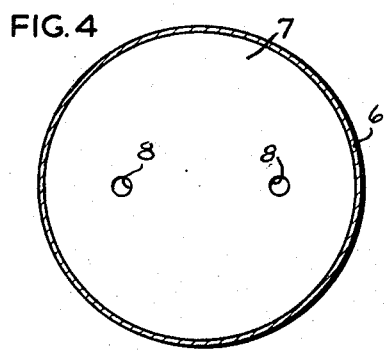
FIGURE 4 is a horizontal transverse sectional view taken substantially on the line 4—4 of FIGURE 1.

If desired, another form of liquid treatment device A' may be provided, as illustrated in FIGURES 5 and 6, and which comprises a frusto-conical container 31, having a top wall 32, a downwardly and outwardly tapering side wall 33, with vertical, marginal portion or skirt 33', and being provided with a series of vertically arranged, scored portions 110 commencing at a point above skirt 33' for selected removal to create flow orifices 111, all of which parts are similar in construction to the corresponding elements of device A hereinabove described. Skirt 33' is externally threaded at 34 for engagement to the internal threads 35 upon the upwardly extending flange 36 of a closure member 37, having a pair of diametrally aligned openings 38, which elements are identical to the corresponding components of device A.

Closure member 37 is centrally apertured, as by punching, as at 39 for extension therethrough of a downwardly projecting bolt or like securing member 30, for threaded reception at its lower end within a tapped socket 41 formed within a base member 42 which is in all respects structurally identical with base member 9 of liquid treatment device A. Interposed between the outer, downwardly directed face of closure 37 and the upper end of base 39, is a flow control plate or disc 43 of substantially like diameter as closure 37, and being provided with a pair of openings 44 axially aligned with, and of like diameter as, openings 38. Said plate 43 is provided with a central opening 45 of greater diameter than the stem of bolt 40 for extension of the latter therethrough, as well as for receiving a bearing collar 46 so as to permit rotative movement of said plate 43 about the axis established by bolt 40. Said plate 43 is relatively tightly received between base member 42 and closure member 37, to provide sufficient friction for assuring stability of plate 43 in any selected position relative to closure member 37.

Although flow control plate 43 has been described hereinabove as being provided with a pair of openings 44, it is to be recognized that the number of openings both in closure 37, as well as disc 43, with respect to device A', and the pair of openings 8 in device A are not to be considered in any way limiting or restrictive. The number of such openings to be actually incorporated in devices A or A' is a matter of selection, based upon the particular needs of the situation. The number of such openings bears directly upon the rate of dissolution of the treatment agent as well as the rate of delivery thereof and the desired rates will necessarily vary depending upon the number of openings as may be provided.

Figure 7:
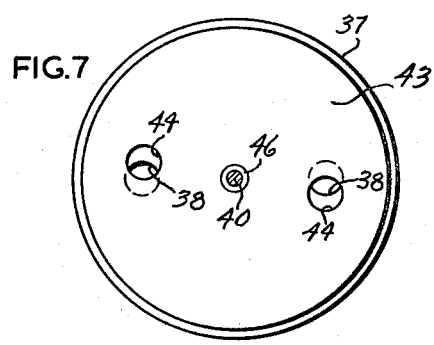
FIGURE 7 is a horizontal transverse sectional view taken substantially on the line 6—6 of FIGURE 5, but showing the control plate openings in partially closed condition.

Liquid treatment device A' operates in the same manner as liquid treatment device A described above, allowing for the selectivity of a particular orifice 111 with all attendant benefits therefrom, but in addition provides further means for controlling the rate of flow of solution from device A' into the ambient liquid. Such control is effected by appropriate disposition of control plate 43 so as to adjust the effective extent of openings 38. For example, FIGURES 5 and 6 illustrate control plate 43 in such position as to allow openings 38 to be in full open position. Whereas, FIGURE 7 illustrates closure plate 43 in such position as to openings 38 so that the same are substantially only half open. By operation of control plate 43, a further, refined control of the flow of liquid into container 1 and of the discharge of the solution therefrom into the ambient liquid may be effected.

The present invention provides devices which may be most economically manufactured; which are completely reliable and durable in usage; which do not require the constant, costly services of an attendant, but assure automatic, requisite operation; and which bring about a most substantial economy in chemical consumption. It is apparent that the present invention may be utilized for a multitude of purposes, but with use in swimming pools being especially obvious.

It should be understood that changes and modifications in the formation, construction, arrangement, and combination of the several parts of the Liquid Treatment Device may be made and substituted for those herein shown and described without departing from the nature and principle of our invention.

Having thus described our invention, what we claim and desire to secure by Letters Patent is:

1. A liquid treatment device for disposition within a body of liquid to be treated comprising means defining a container for receiving a supply of dry liquid treatment material soluble in the liquid to be treated, said container having a top end, a lower end, and an intervening side wall, there being at least one opening in said lower end for directing liquid downwardly from said container, there being a plurality of vertically arranged orifices in said side wall proximate said lower end, means for selectively closing said orifices so as to control the level of liquid in said container, whereby the amount of soluble material in said container exposed to the liquid therein may be controlled for affecting the quantity of said material in said liquid, a control plate being disposed immediately beneath the lower end of said container, means for rotatably mounting said control plate on said container, said control plate having at least one aperture for normal vertical alignment with the said opening in said container lower end so that upon rotation of said control plate, the effective extent of said opening may be controlled for affecting the rate of liquid flow into and from said container.

2. A liquid treatment device as defined in claim 1, and further characterized by means for urging said container into upright condition, secured to said container lower end and disposed downwardly of said control plate.

3. A liquid treatment device for immersion within a body of liquid comprising means defining a container for receiving a supply of solid material soluble in the liquid of the said body of liquid and having a lower end wall, an upper end wall, and an intervening side wall, which latter cooperate to define a chamber, said container being fabricated of plastic material non-reactive with the liquid and the solid material, said container having a plurality of vertically arranged, spaced-apart discrete scored portions, each of said scored portions having a continuous line of scoring defining a removable section for developing an aperture upon removal for flow therethrough of liquid from said body of liquid, said container further having a discharge opening in its lower end wall for flow therethrough of liquid from said chamber having solid material dissolved therein whereby a continuous circulation is established through said container by said discharge opening and said developed apertures, said scored portions permitting selective opening of said apertures for controlling the amount of soluble material in said container exposed to the liquid for affecting the quantity of said material dissolved in said liquid, and plug-forming means for effecting optional closure of said apertures developed by removal of the related section.

4. A liquid treatment device as defined in claim 3 and further characterized by means for detachably engaging the lower end wall of said container to the said side wall.

5. A liquid treatment device as defined in claim 3, and further characterized by means secured to the lower end of said container for urging the same into upright position.

6. A liquid treatment device as defined in claim 3, and further characterized by means for controlling the effective extent of the opening in the lower end of said container.

References Cited

UNITED STATES PATENTS

| 397,063 | 1/1889 | Barrow | 137—577 X |
| 492,631 | 2/1893 | Pickering | 4—228 |
| 917,189 | 4/1909 | Tritle | 137—577 X |
| 1,228,363 | 5/1917 | MacKenzie | 137—577 X |
| 1,904,428 | 4/1933 | Enemark | 137—268 X |

M. CARY NELSON, *Primary Examiner.*

M. O. STURM, *Assistant Examiner.*